Oct. 3, 1967   J. NICOL   3,345,091
HOSE AND METAL TUBE COUPLING
Filed Dec. 8, 1964
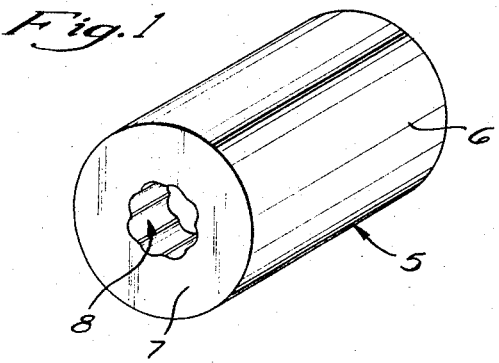
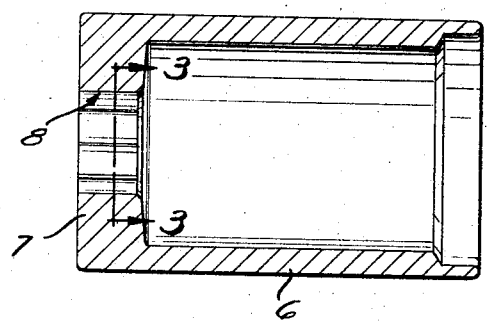
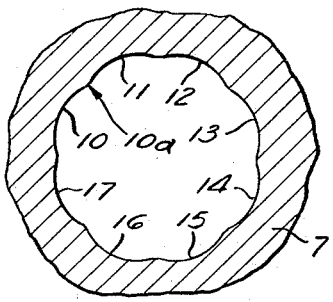
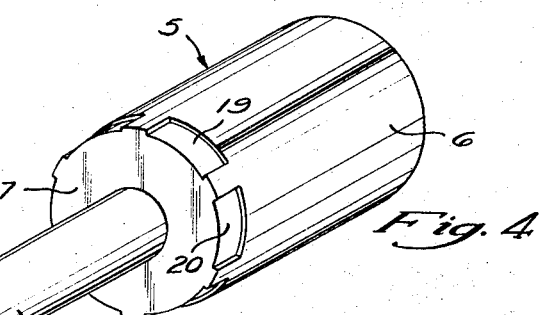
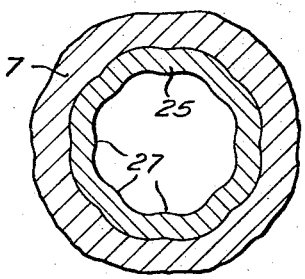
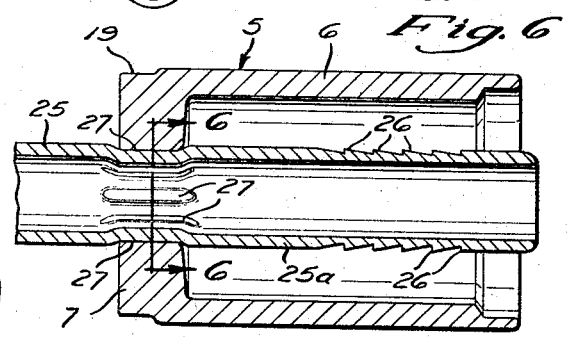
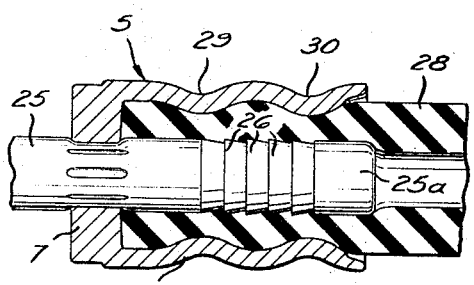
INVENTOR.
JOHN NICOL
BY
McNENNY, FARRINGTON, PEARNE & GORDON
Donald W. Farrington
ATTORNEYS

United States Patent Office 3,345,091
Patented Oct. 3, 1967

3,345,091
HOSE AND METAL TUBE COUPLING
John Nicol, Fairview Park, Ohio, assignor to The Weatherhead Company, Cleveland, Ohio, a corporation of Ohio
Filed Dec. 8, 1964, Ser. No. 416,849
4 Claims. (Cl. 285—256)

This invention relates to hose end fittings and more particularly to a hose end fitting having a skirt portion which is crimped onto the hose received by the fitting.

Recent developments in the art of cold forming intricate parts, which have heretofore been machined from bar stock in automatic screw machines, have resulted in the availability of cold formed cup-shaped articles.

It is among the objects of my invention to provide a hose end fitting which includes a cold formed cup-shaped body having an elongated cylindrical skirt and a non-circular central opening in the end of the body which opening is adapted to receive a tubular metal section and the end of the body is crimped onto the tubular section whereby the tubular section within the skirt forms the hose nipple of the completed fitting.

Further objects of my invention are to provide a hose end fitting for coupling a hose to a metal tube according to the preceding object wherein the end of the body which receives the tube is crimped onto the tube so that non-circular portions of the body indent the tube and form re-entrant spaced axially extending recesses in the tube which operate to lock the tube and the body against relative rotary and axial motion prior to the attachment of the cut hose to the fitting.

It is a further object of my invention to provide a hose end fitting according to the preceding objects wherein that portion of the metal tube located within the skirt portion of the body forms the nipple for the fitting and is provided with axially spaced re-entrant barbs which are proportioned to pass through the axial opening in the end of the fitting body prior to crimping the body onto the metal tube.

Further objects and advantages relating to low cost construction and efficiency in performance will appear from the following description and the appended drawings wherein:

FIG. 1 is a perspective view of the forged body having a skirt which forms a part of the fitting;

FIG. 2 is a cross-sectional view of the forged body shown in FIG. 1;

FIG. 3 is an enlarged sectional elevation taken as indicated at 3—3 in FIG. 2;

FIG. 4 is a perspective view of the fitting after the body has been crimped onto a metal tube which forms the nipple of the fitting;

FIG. 5 is a sectional elevation of the cold forged body and the metal tube as locked together by the crimping of the body onto the metal tube;

FIG. 6 is a cross-sectional elevation taken at 6—6 of FIG. 5 through the fitting showing the wall deformation of the metal tube resulting from the crimping of the forged body on the metal tube; and FIG. 7 is a sectional elevation showing the fitting as crimped onto the hose.

Referring to the drawings, the cold formed steel body indicated at 5 includes a cylindrical skirt section 6 and a head section 7 which is provided with the non-circular aperture 8. It will be understood by those skilled in the art that the cup-shaped element 5 may be formed in a cold header or progresisve header from cylindrical steel rod stock wherein a cut blank of cylindrical rod stock is worked in bed frame dies by punches carried on a reciprocating header slide. In the final forming operation in the cold header the aperture 8 is formed by a tool contoured to give the resulting opening 8 in the head 7 and eight (8) angularly spaced arcuate grooves indicated at 10 to 17 in FIG. 3. The inwardly extending ribs, such as the rib 10a, at the juncture between adjacent grooves such as 10 and 11 move inwardly toward the central axis when the body is exteriorly crimped as at 19 and 20 in FIG. 4.

A metal tube, such as the tube 25, is provided with re-entrant barbs indicated at 26 in FIG. 5. Preferably the tube 25 is formed of steel. Accordingly the barbed end of the tube 25a may be inserted through the non-circuit opening 8 in the body 5 which is crimped onto the tube 25 as shown in FIG. 5. The non-circular shape of the opening 8 is impressed on the tube 25 resulting in elongated recesses 27 in that area of the tube which is locked to the body 5. The tube is effectively locked against rotary motion and axial motion by the crimping operation. The completed hose end assembly, as illustrated in FIG. 5, is ready to receive the cut end of the hose 28. Preferably the skirt portion 6 of the cold formed body is crimped to the hose in axially spaced areas 29 and 30. The crimping operations at 29 and 30 insure that the material of the hose at its inner diameter is moved inwardly against the hose nipple 25a and is locked onto the nipple barbs 26.

Prior art devices of this general type have included a body made in an automatic screw machine and copper brazed to a steel tube such as the tube 25. Tests, such as pull-off and torque tests, have been conducted on samples of automotive hydraulic assemblies made according to the invention disclosed here. Such tests show that the crimping of the body onto the tube as disclosed here results in a hose end assembly acceptable for high pressure automotive use. The cold forming of the body 5 represents a substantial reduction in cost as compared to parts made in automatic screw machines and the structure results in great economy in materials and time of manufacture without sacrifice of efficiency in operation.

Although I have shown and described one form of my invention in considerable detail, it will be appreciated that variations may be made therein without departing from the scope of the invention as defined in the following claims:

What is claimed is:

1. A hose end fitting comprising a one-piece body having a generally cylindrical tubular skirt and a head at one end thereof, said head providing a generally radial end wall extending inwardly from said skirt to define a central noncircular opening concentric with said skirt, said end wall providing a plurality of inwardly extending projections circumferentially spaced around said opening and having a radius from the axis of said skirt, and a tubular nipple in said opening and extending coaxially with said skirt for substantially the full length thereof, said nipple on both sides of said opening having a circular outer surface having a predetermined radius greater than the radius of said projections, the portions of said nipple within said opening having a re-entrant section receiving and engaging each projection, said nipple providing an exterior surface completely around each re-entrant section which has a radius greater than the minimum radius of each associated projection whereby said projections mechanically lock said body and nipple against both rotational and axial relative movement, the exterior surface of said head having a plurality of circumferentially spaced indentations encircling said projections, the inner wall of said skirt having a substantially circular shape throughout its length, the outer surface of said nipple within said skirt being formed with a plurality of barbs, the interior surface of said skirt being spaced from the exterior surface of said nipple so that the end of a piece of hose may be inserted therebetween, said skirt being adapted to be inwardly deformed against the end of a piece of hose to radially compress such tubing against said barbs and to grip said hose.

2. A hose end fitting as set forth in claim 1 wherein said wall has an axial thickness substantially greater than the axial length of said indentations, and the edge of said indentations closest to said skirt being axially spaced from said skirt.

3. A hose end fitting as set forth in claim 2 wherein said body is formed of a ferrous material, and the material of said end wall has a grain structure resulting from radially inward deformation of the material of the end wall to form said indentations and reduce the radius of said projections.

4. A hose end fitting as set forth in claim 3 wherein the material of said skirt and head have a grain structure resulting from cold forming of said body.

References Cited

UNITED STATES PATENTS

| 291,693 | 1/1884 | Cole | 174—84.1 X |
|---|---|---|---|
| 1,768,095 | 6/1930 | Arthur | 285—382.2 |
| 2,310,536 | 2/1943 | Melsom | 29—508 |
| 2,329,281 | 9/1943 | MacWilliam et al. | 29—508 |
| 2,358,019 | 9/1944 | Melsom | 285—256 |
| 2,889,603 | 6/1959 | Joy et al. | 174—90 X |

FOREIGN PATENTS 562,105   6/1944   Great Britain.

CARL W. TOMLIN, *Primary Examiner.*

THOMAS F. CALLAGHAN, *Assistant Examiner.*